LENS SURFACING MACHINE FOR FORMING BOTH SURFACES OF A LENS SIMULTANEOUSLY
Filed March 24, 1967
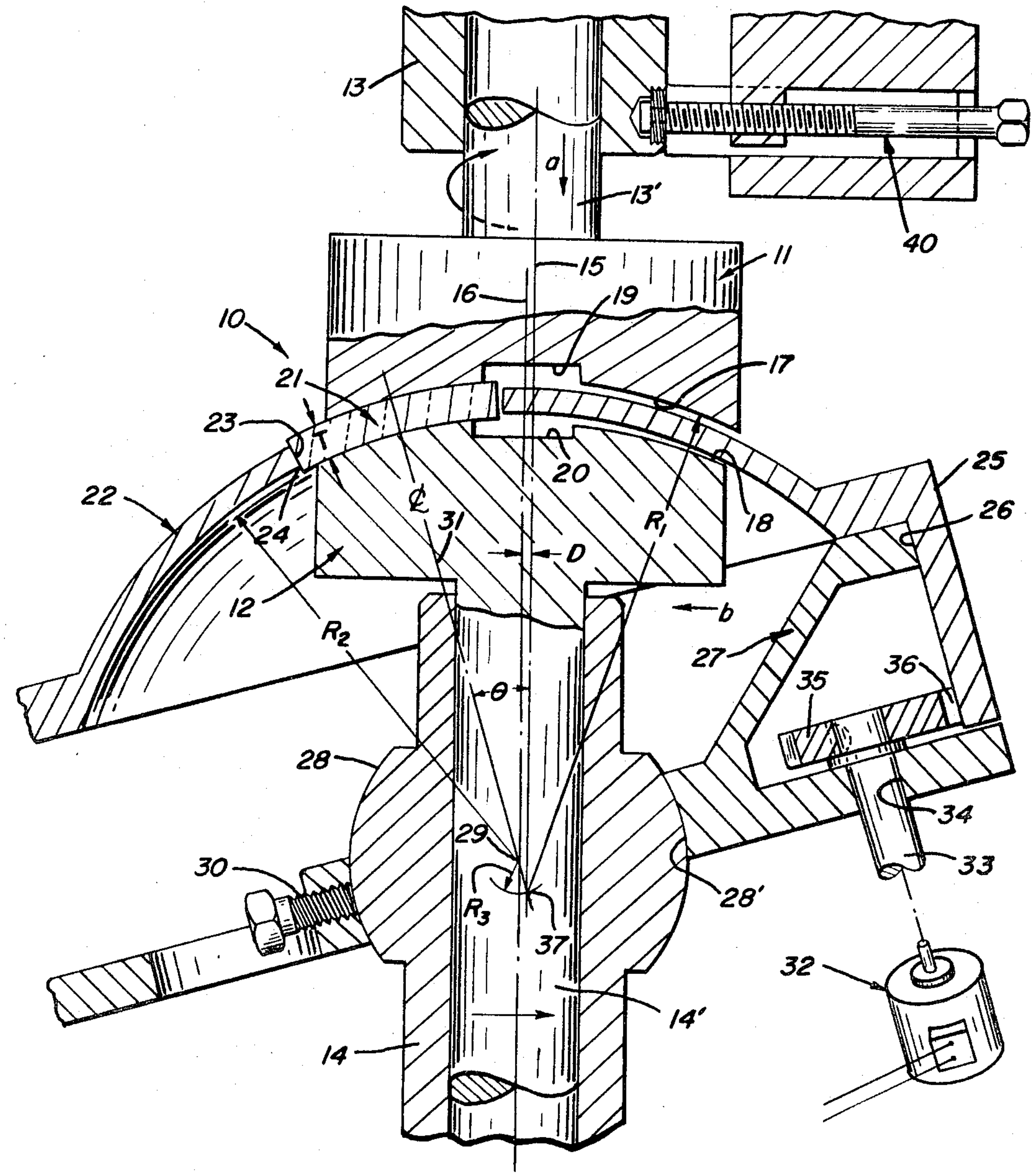
RAYMOND T. BLUM
THEODORE J. ZAK
INVENTORS
BY Frank C. Parker
ATTORNEY United States Patent Office 3,444,652

Patented May 20, 1969

3,444,652

LENS SURFACING MACHINE FOR FORMING BOTH SURFACES OF A LENS SIMULTANEOUSLY

Raymond T. Blum, Pittsford, and Theodore J. Zak, Irondequoit, N.Y., assignors to Bausch & Lomb Incorporated, Rochester, N.Y., a corporation of New York Filed Mar. 24, 1967, Ser. No. 625,651
Int. Cl. B24b *13/02*
U.S. Cl. 51—89 8 Claims

ABSTRACT OF THE DISCLOSURE

A lens forming machine for meniscus lenses which operates on both refractive surfaces simultaneously by lapping with diamond faced tools and/or polishing with polish impregnated pads.

*Background of the invention*

Usually a meniscus lens is manufactured from a bulky glass blank having an excess of glass sufficient to accommodate even the largest standard lenses. As a result, the amount of stock to be ground off the blank at each operation is too much for economical production of the smaller sizes of lenses. It is not only a waste of glass but is also a waste of time. Both of these items are expensive and in addition, large quantities of machinery of a special design are required to perform the dozen or so operations involved such as blocking, deblocking, rough milling, finished milling, lapping and polishing.

For some time, the inventors of the present invention have been aware of the advantage of working both sides of a meniscus lens simultaneously and during this time have instituted the practice of molding the glass blanks very close to the finished curvature required, the lens surfaces on such molded blanks being relatively smooth and free of any irregularities.

Machines for simultaneous two-sided lens lapping are shown in the U.S. patents to Touvay, 2,587,926 and David 2,309,936 wherein the meniscus lens is held between the confronting working faces of two rotating tools.

*Summary of the invention*

The present invention relates to a lens surfacing machine for rough and fine lapping and for polishing lens surfaces, and more particularly relates to a twin or double surfacing machine for meniscus lenses which forms both refractive lens surfaces simultaneously.

In view of the foregoing, it is an object of the present invention to provide a lens surfacing machine for simultaneously forming the two opposite refractive surfaces of a meniscus lens, regardless of whether the lens has positive or negative power.

A further object is to provide such a device which is easily adaptable to accomplish various forming operations such as lapping and polishing with an excellent degree of accuracy and precision.

It is a still further object to provide such a device which produces a finished lens from a molded lens blank at a rapid rate and at comparatively low cost.

Further objects and advantages of the present invention may be found in the form and arrangement of the parts thereof, a full disclosure of which is found in the following specification, taken in connection with the accompanying drawing.

*Brief description of the drawing*

The single figure of the drawing is a midsectional view of one form of a double action or twin surfacing lens forming machine representative of the present invention.

*Description of the preferred embodiment*

The preferred forms of the "twin surfacing" lens forming machine is generally indicated by numeral 10 in the drawing and it comprises upper and lower metallic lens forming tools 11 and 12, either one or both of which are provided with an axial feed mechanism, not shown, for motion in the direction of arrow *a*. Tools 11 and 12 are rotatably journaled in suitable upper and lower bearing members 13 and 14 respectively by means of individual shafts 13' and 14', said tools having individual rotation axes 15 and 16 respectively which are mutually parallel and are offset from each other by a distance designated D for a purpose to be explained hereinafter.

Confronting working surfaces 17 and 18 are formed on tools 11 and 12 respectively, said surfaces being spherically shaped with different radii designated $R_1$ and $R_2$ respectively so as to form a meniscus lens as more fully set forth hereinafter. In the central portion of the tools 11 and 12 is formed the sunken recesses 19 and 20 respectively, to permit the flow of the coolant or abrasive slurry. If recesses are not used, radial cuts may be used.

As indicated heretofore, the lens forming tools 11 and 12 are primarily intended to be used in a precision finishing operation on a meniscus lens 21 which has otherwise very smooth surfaces having radii which very closely conform to a specified curvature. However, the invention basically contemplates the use of rougher lens blanks if desired. The prescribed dimensional values for the radii $R_1$ and $R_2$ as well as the relationship therebetween are set forth herebelow.

Means are provided for holding the lens 21 in a position between the working faces or bands 17 and 18 of the lens forming tools 11 and 12 comprising a spherical shell 22 which is positioned freely therebetween and has a conforming opening 23 formed therein which is shaped to loosely fit the peripheral edge 24 of lens 21. The lens holding shell 22 is provided peripherally with a rim portion 25 which is rotatably journaled at 26 on the peripheral part of a stationary ring-like base member 27. Member 27 is adjustably and inclinedly secured on the lower bearing member 14 by a ball joint structure 28 which is preferably integrally formed on said bearing member 14 and includes a conforming concave spherical surface 28' formed on the base member 27. All of the spherical surfaces of the ball joint 28 have a common center which coincides with the center of curvature 29 of the radius $R_2$ on axis 16. The supporting base member 27 is secured in any required tilted position in any preferred manner such as the set screw 30 which is threaded through a portion of member 27 so as to bear against the ball 28.

It is important that the lens holding shell 22 revolve about the optical axis 31 of the lens 21 and therefore the bearing surface 25, 26 is concentric with said axis. More explicitly, the lens holding shell 22 during its revolutions turns the lens 21 around continuously at a rate of rotation which is best suited to the rate of grinding, lapping or polishing which is desired.

Power is provided to revolve the lens holding shell 22 at a constant speed as schematically shown in the holding shell 22 by means including a suitable motor 32 which transmits power through a shaft 33 which is journaled in the base member 27 at 34. Adjacent to the base member 27 on the other end of the shaft 33 is fixed in any suitable manner a spur gear 35 which meshes with an internal ring gear 36 formed on the lower edge of the rim portion 25 of the shell 22. The form of the power mechanism shown schematically in the drawing and described hereabove is exemplary only and may be constructed in numerous other ways as long as the shell 22 is rotated slowly and evenly by such alternate mechanism.

Having now described the general nature of the lens forming machine 10, the novel essential features of the invention are particularly pointed out herebelow.

(1) The tool faces or working bands 17 and 18 should be diamond impregnated or the like, whenever the lens 21 is to be lapped so as to provide maximum wear resistance for said faces and thereby maintain the proper radius specification of the lens surfaces during production runs.

(2) The active surface of each tool should have a diameter preferably as large as possible and at least larger than the diameter of the lens.

(3) The width of the active abrasive working bands or surfaces reaching from the peripheral edges to the central recess 19 or 20 of each tool 11 or 12 should be less than the diameter of the lens 21.

(4) The axes of tools 11 and 12 should not only be parallel to each other but means should be provided whereby the space D therebetween can be adjusted for a reason to be explained hereinafter.

(5) The tool axes of rotation 15 and 16 of the tools 11 and 12 should extend past the edge of said lens at a distance therefrom, except in the case of strong negative lenses wherein the axis for the lower tool only intersects the lens, the other axis lying at a distance therefrom, said axes intersecting the optical axis 31 at different places, i.e., at 29 and 37. In other words, the angle $\theta$ lying between the optical axis 31 and tool axis 16 should in most cases be greater than the corresponding angle subtended by the radius of lens 21. The aforesaid means for adjusting the offset distance D is shown generally schematically in the drawing and is designated by numeral 40.

With reference to the reason for providing a separation between the axes 15 and 16 of the respective lens forming tools 11 and 12, as mentioned in the above paragraph (4), it will be noticed from the drawing that the entire lens 21 is formed completely on one side of the forming tools; that is, in most cases the lens lays entirely on one side of said axes 15 and 16. Therefore, it is apparent that if a truly "parallel" lens is to be formed in which $R_1-T-R_2$, the centers 29 and 37 of the aforementioned radii must lie on axis 31 and are coincident and the separation between said axes 15 and 16 equals zero. However, for any other numerical relationship between the radii $R_1$ and $R_2$, because of the fact that the lens is advantageously formed predominately on one side of the tools, the forming tool 12 must be moved in the direction of arrow *b* to produce a separation D of the axes 15 and 16 in order to avoid forming a wedged shaped lens. In other words, the offsetting of axis 16 from axis 15 has the effect of making the edge thickness of the lens 21 substantially the same on both sides and a near parallel relationship is established between the refractive surfaces of the lens 21.

The mathematical procedure by which the amount of offset D is established is as follows:

$$R_1-R_2=\text{Difference}$$

Lens Thickness $T$—the Difference$=R_3$, which is the intercept on the optical axis 31 between the centers 29 and 37 from which the radii $R_2$ and $R_1$ are swung.

(Offset) $D-R_3 \sin\theta$, the symbol $\theta$ being defined hereabove.

The above described offset D and the method of determining the offset are important features of the present invention and have the effect of extending the range of lens surface diameters to substantially all lenses which have a meniscus form.

Furthermore, the technique of offsetting axis 16 with reference to axis 15 does not in any way prevent the generation of a proper refracting surface when the lens 21 is rotated by the lens holding shell 22.

It will be understood in the previous mention of the words "positive" and "negative" lenses that when the value of $R_2+T<R_1$, the lens power is called "NEGATIVE." Conversely, when the lens power is "POSITIVE," the expression which applies is then $R_1+T<R_2$. It should be realized also that considerable range of numerical values from $R_1$ and $R_2$ may be used regardless of whether the lens 21 is of positive form or negative form, the limiting factor being the interferences which are encountered on the active lens forming faces 17 and 18 on the lens forming tools 11 and 12 respectively. Of course the thicker the lens 21, and the smaller the diameter of the lens 21, the more range is possible in the difference of relative values for the surfaces of the lens 21.

In operation, with the lens forming tool 11 elevated sufficiently above the lens holding shell 22, a suitable pressed lens blank 21 is inserted in the lens holding opening 23 and the inclined position of the lens holding shell 22 is adjusted so that substantially equal amounts of the lens overhang the edges of the working surfaces of the tools 11 and 12 as shown in the drawing. The lens shell support 27 is held in the correct position by the set screw 30 or otherwise as preferred. Calculations as previously set forth hereabove have previously been made to determine the value of the offset D and the offset D is thereupon adjusted by moving tool 12 laterally as indicated in the direction of the arrow *b*. Then the tool 11 is lowered into contact with the lens 21 and the drive means for the tools 11 and 12 is set in motion as well as the drive motor 32 for rotating the lens holding shell 22.

One of the outstanding characteristics of the machine 10 is the ability to completely form the lens 21 in comparatively short time which is a matter of seconds for lapping and a minute or two for polishing.

All of the above operations apply only to the lapping or grinding operation and only an ordinary liquid coolant is applied to the surface of the tools, such a coolant being described in the prior art. It is possible however to provide a polishing operation as a finishing step by the use of the machine 10 following the lapping operation.

There are certain distinctive differences between the apparatus and method of procedure when changing from lapping to polishing of the lens. One distinction is that the tools 11 and 12 are interchanged with other preferably cast iron tools or other metallic tools having the same curvatures $R_1$ and $R_2$ formed thereon and offset from each other by the same dimension D.

A second difference is that a polishing compound is usually fed in slurry form onto the working surfaces 17 and 18 of the tools 11 and 12 and longitudinal pressure of a desirable degree is applied axially of the tool 11 to affect a satisfactory polish. If it is found necessary, a "break-up" motion may be used in connection with the lens polishing operation, such a motion not being specified in detail in this invention. The usual polishing pads are used between the opposed refractive surfaces of the lens 21 and the working surfaces 17 and 18 of the tools which do the polishing.

A further difference between the lapping and polishing operations is that it is not necessary to rotate the tools 11 and 12 in opposite directions when lapping whereas due to the increased pressure and frictional effect of the operation when polishing, it is advantageous but not strictly necessary to rotate the tools in opposite directions. This is particularly true on thin lenses which have small edge contact within the openings 23 of the lens holding shell 22.

It will be observed in the foregoing that there is here provided a lens forming machine which is exceedingly rapid in operation and capable of finishing large quantities of meniscus lenses at comparatively low cost while maintaining close adherence to all precision standards which are necessary to produce a high grade lens of this kind. Although only one form of the present invention has been shown and described in detail as an exemplary form of the invention, many other forms are possible and changes may be made in the specific details and arrangements of the parts thereof without departing from the spirit of the invention as set forth in the claims herebelow.

We claim:

1. A lens surfacing machine for simultaneously forming both of the refractive surfaces of a meniscus lens, said machine comprising the combination of a first spherically faced lens forming tool,
a second spherically faced lens forming tool,
means for rotatably mounting said tools with the spherical faces thereof located in confronting spaced relation to each other so that said lens is confined therebetween,
the axes of rotation of the tools being parallel to each other and at least one lying at a distance outwardly from the edge of said lens, said axes intersecting the optical axis of the lens at different points,
second means interposed at least partly between said tools and in contact with the lens edge surface for holding the lens between said faces for rotation about the optical axis of the lens, and
third means for rotating said second means around said optical axis during the forming operation.

2. A lens surfacing machine for simultaneously forming the refractive surfaces of a meniscus lens as set forth in claim 1, said first and second tool being provided with a diamond working face.

3. A lens surfacing machine for simultaneously forming the refractive surfaces of a meniscus lens as set forth in claim 1, one of said faces being concave and the other being convex.

4. A lens surfacing machine for simultaneously forming the refractive surfaces of a meniscus lens as set forth in claim 1, the parallel axes of said tools being adjustably spaced apart, and
means for adjusting one tool laterally with reference to the other to maintain nominal parallelism between said faces when large diameter tools are used.

5. A lens surfacing machine for simultaneously forming the refractive surfaces of a meniscus lens as set forth in claim 1, said faces being characterized by a working band width which is less than the greatest diameter of said lens.

6. A lens surfacing machine for simultaneously forming the refractive surfaces of a meniscus lens as set forth in claim 1 wherein the outer diameter of at least one of said tools is greater than two times the largest diameter of said lens and includes means forming a central recess in the working faces thereof which the inner edge of the lens may overhang.

7. A lens surfacing machine for simultaneously forming the refractive surfaces of a meniscus lens as set forth in claim 1, wherein said second means is a rigid circular shell shaped to conform approximately to the shape of said tool faces, and means for rotatably supporting said shell on its periphery concentrically with said optical axis.

8. A lens surface forming machine for simultaneously forming both of the refractive surfaces of a meniscus lens, said machine including the combination of means for rotatably mounting a pair of lens forming tools in relatively opposed position on either side of said lens, one tool having a convex working surface of radius $R_1$ and the other tool having a concave working surface of radius $R_2$, both working surfaces simultaneously forming said lens having thickness T, the respective axes of rotation of said tools being parallel to and spaced from each other by a distance D so as to intersect the optical axis of said lens at two different points, the angle $\theta$ between said tool axes and said optical axis in most cases being greater than the similar angle which is subtended by the longest transverse radius from the optical center to the edge of the lens,
means forming a corresponding central recess in each of said tools,
lens holding means interposed between and free of said tools, said means having a noncircular edge surface defining a recess wherein said lens is held, said edge surface being loosely fitted to the periphery of said lens,
means for rotatably mounting said lens holding means for rotation about the optical axis of said lens, and
means operatively connected for continuously rotating said lens holding means,
the distance D being determined by the mathematical expression given herebelow $$D=T-(R_2-R_1)\sin\theta$$

References Cited

UNITED STATES PATENTS

| | | | |
|---|---|---|---|
| 1,521,116 | 12/1924 | Miller | 51—89 X |
| 1,995,676 | 3/1935 | Gagnon | 51—89 |
| 2,309,936 | 2/1943 | David | 51—89 |
| 2,587,926 | 3/1952 | Touvay | 51—88 |

HAROLD D. WHITEHEAD, *Primary Examiner.*

U.S. Cl. X.R.

51—118

PO-1050
(5/69)

UNITED STATES PATENT OFFICE
CERTIFICATE OF CORRECTION

Patent No. 3,444,652 Dated May 20, 1969

Inventor(s) Raymond T. Blum and Theodore J. Zak

It is certified that error appears in the above-identified patent and that said Letters Patent are hereby corrected as shown below:

Column 3, line 10, after "least" add -- 2x --;
line 40, after "T" change " __ " to -- = --;
line 59, before "Lens" add -- When the lens surfaces are parallel to each other, --; after "T" change " __ " to -- = --; line 62, after "D" change " __ " to -- = --

Column 6, line 11, change "$R_1$" to -- $R_2$ --;
line 12, change "$R_2$" to -- $R_1$ --;
line 36, change "$R_2$—$R_1$" to -- $R_1$—$R_2$ --

SIGNED AND SEALED
APR 7 1970

(SEAL)
Attest:

Edward M. Fletcher, Jr.
Attesting Officer

WILLIAM E. SCHUYLER, JR.
Commissioner of Patents